No. 757,022. PATENTED APR. 12, 1904.
C. W. CARRIER.
WATER COOLER FOR INTERNAL COMBUSTION ENGINES.
APPLICATION FILED FEB. 24, 1903.
NO MODEL. 3 SHEETS—SHEET 1.
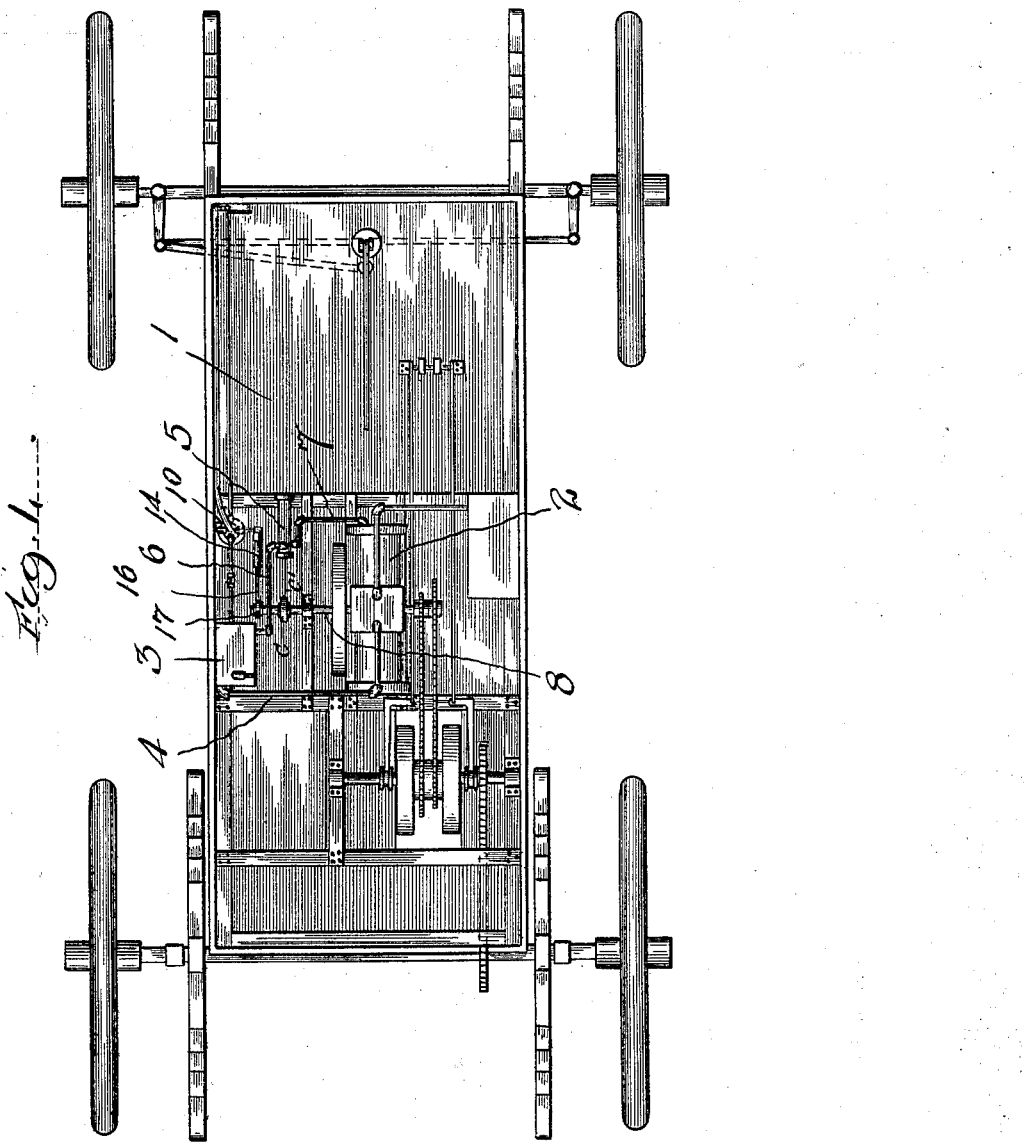

No. 757,022. PATENTED APR. 12, 1904.
C. W. CARRIER.
WATER COOLER FOR INTERNAL COMBUSTION ENGINES.
APPLICATION FILED FEB. 24, 1903.
NO MODEL. 3 SHEETS—SHEET 2.
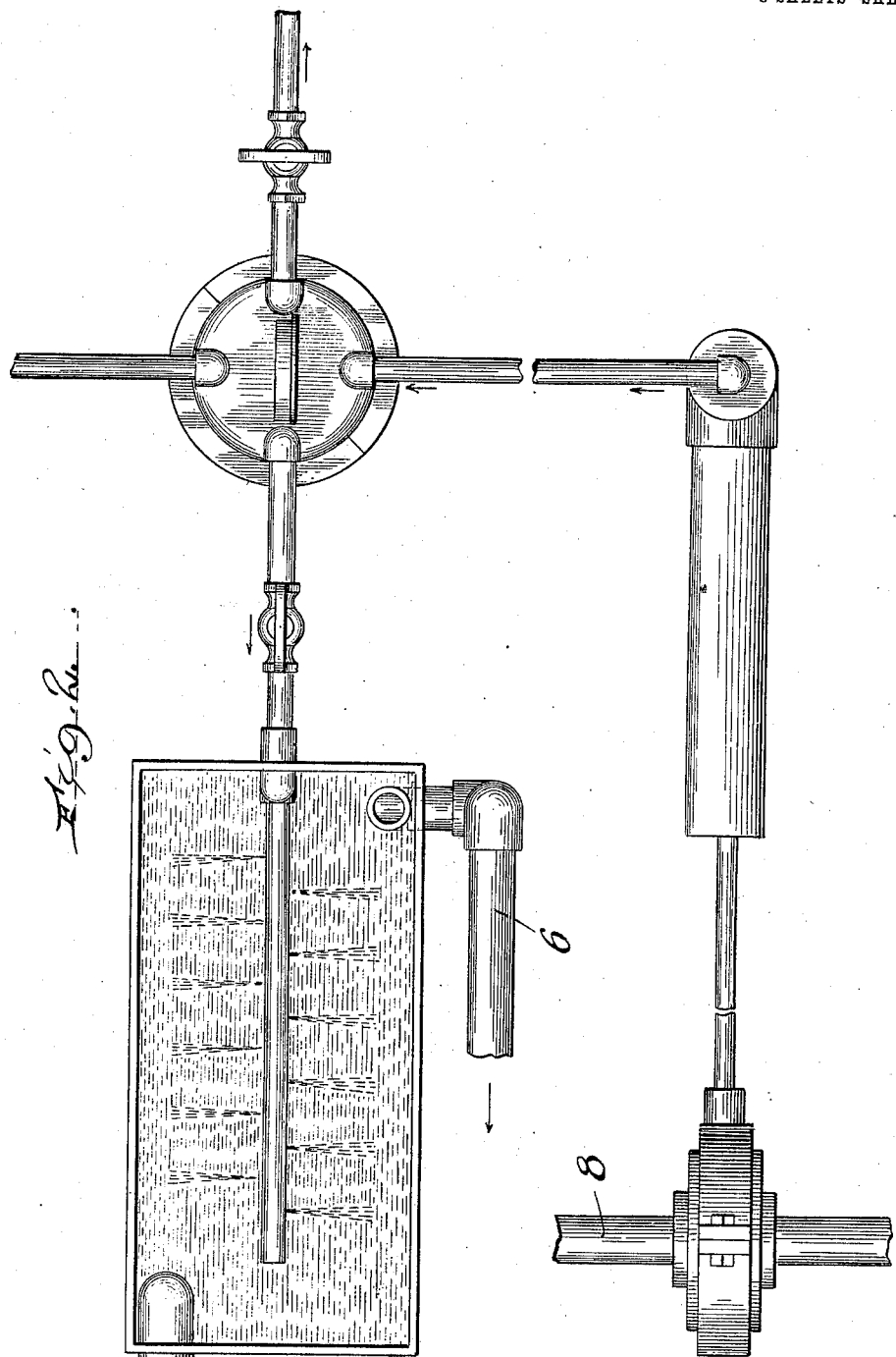

No. 757,022. PATENTED APR. 12, 1904.
C. W. CARRIER.
WATER COOLER FOR INTERNAL COMBUSTION ENGINES.
APPLICATION FILED FEB. 24, 1903.
NO MODEL. 3 SHEETS—SHEET 3.
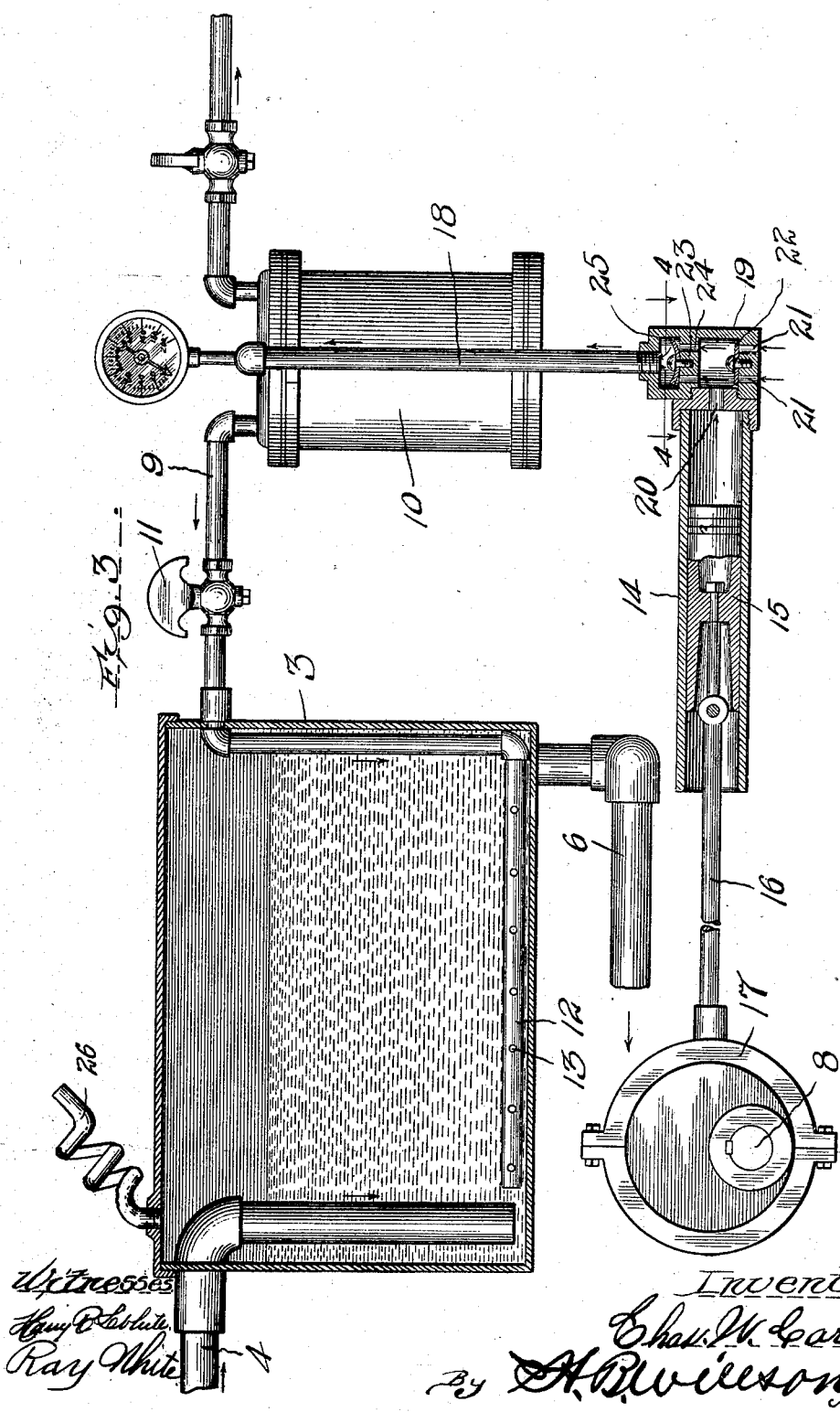

No. 757,022.

Patented April 12, 1904.

UNITED STATES PATENT OFFICE.

CHARLES W. CARRIER, OF DESPLAINES, ILLINOIS.

WATER-COOLER FOR INTERNAL-COMBUSTION ENGINES.

SPECIFICATION forming part of Letters Patent No. 757,022, dated April 12, 1904.

Application filed February 24, 1903. Serial No. 144,788. (No model.)

*To all whom it may concern:*

Be it known that I, CHARLES W. CARRIER, a citizen of the United States, residing at Desplaines, in the county of Cook and State of Illinois, have invented certain new and useful Improvements in Water-Coolers for Internal-Combustion Engines; and I do declare the following to be a full, clear, and exact description of the invention, such as will enable others skilled in the art to which it appertains to make and use the same.

This invention relates to a cooling apparatus applicable for use as a cooler for the circulating cooling fluid of liquid-cooled internal-combustion engines.

The object of the invention is to provide a cooling apparatus of this character in which the heat-laden cooling liquid is maintained at a relatively low temperature by the passage therethrough of a current or currents of air whereby the heat is absorbed therefrom and conveyed to the atmosphere, and, further, to provide simple and effective mechanism for supplying the air.

In the accompanying drawings, Figure 1 is a bottom plan view of a motor-vehicle embodying the invention. Fig. 2 is a top plan view, on an enlarged scale, of the air and water tanks and air-supply pump, the cover of the water-tank being removed. Fig. 3 is a view in elevation of the same parts, the water-tank and air-pump appearing in vertical section.

Referring to the drawings, 1 denotes the body of a motor-vehicle; 2, a motor mounted thereon and conventionally represented as a water-jacketed internal-combustion motor; 3, a water-tank connected to the water-jacket of the motor by a pipe 4; 5, a water-circulating pump connected to the tank by a pipe 6 and to the water-jacket of the pump by a pipe 7, and 8 the driving-shaft of the vehicle actuated by the said motor. It will be understood that this construction and disposition of parts provides the usual circuit for the cooling-water, which is drawn from the tank 3 by the pump 5 through pipe 7 into the water-jacket of the motor 2, circulates through said jacket and takes up the heat liberated by the exploding gases, and then passes through pipe 4 back again to the tank 3, to be again circulated in like manner. It is desirable to keep this water, which is in constant circulation, as cool as possible, so as to take up a large amount of the heat from the motor to keep the latter in good working condition, and it is the purpose of my invention to accomplish this by forcing jets of air through the water in the tank, the air on its passage taking up the heat from the water and finally exhausting to the atmosphere.

It will be noted that the pipe 6 opens into the bottom of the water-tank 3, while the return-pipe 4 opens into the top thereof and projects down through the body of water to near the bottom of the tank, whereby when the vehicle is at rest and the operation of the pump is arrested the water may continue to flow for a period by a siphoning action through the pipes, such siphoning action being instituted by the continued motion of the water and the heating and cooling of water which tends to produce a circulation.

Connecting with the tank 3 through an air-supply pipe 9 is an air tank or reservoir 10, and in said pipe 9 is a valve 11, whereby the supply of air to the water-tank from said air-tank may be controlled. The pipe 9 enters the tank 3 above the level of the water therein and then extends downward to the bottom of the tank and terminates in a horizontal injector 12, provided in its sides with jet-apertures 13, through which a plurality of streams of air are simultaneously injected in the tank. The tank 10 is supplied with air under compression from an air-pump 14, the reciprocating piston 15 of which is connected by a rod 16 with an eccentric 17 on the shaft 8, the pump being in communication with the tank through an interposed pipe 18. The supply of air from the pump to the pipe 18 is controlled by valve mechanism comprising a valve-chamber 19, coupled to the outer end of the pump-cylinder 14 and in communication therewith through a port 20. This chamber 19 is formed with air-inlet openings 21, disposed below the port 20 and controlled by a flap-valve 22. It is also provided above the port 20 and between the same and the pipe 18 with a diaphragm 23, in which are formed ports 24, controlled by a flap-valve 25. In operation of the pump the inward movement of the piston 15 draws air in through the ports 21, and this air enters the pump-cylinder through the port 20. Upon the outward movement of the pump-piston the air taken in is forced again through the port 20 back into the chamber 19, the valve 22 closes to prevent its escape and the air consequently taking an upward course, passing through the ports 24 and opening the valve 25, thence flowing into the pipe 18 and through the same to the tank 10, the check-valve 25 then closing to prevent the air from returning.

When the motor 2 is in operation, motion will be communicated from the shaft 8 to drive the air and water circulating pumps, and the water as it flows into the tank 3 will be cooled by the jets of air injected from the pipe 12, the air passing through the water and taking up the heat therefrom and finally discharging through the coil 26 to the atmosphere. By this means the water may be kept at a comparatively cool state, so as to readily absorb the maximum amount of heat from the motor.

From the foregoing description, taken in connection with the accompanying drawings, the construction, mode of operation, and advantages of the invention will be readily apparent, it is thought, without requiring a more extended explanation.

Various changes in the form, proportion, and the minor details of construction may be resorted to without departing from the principle or sacrificing any of the advantages of the invention.

Having thus described my invention, what I claim as new, and desire to protect by Letters Patent, is—

The combination of a motor having a water-jacket, a water-tank, a pump, operated by the motor, a flow connection from the bottom of the tank to the pump and from thence to the water-jacket, a return connection from the water-jacket to the bottom of the water-tank, an air-pump operated by the motor, and a connection therefrom discharging into the bottom of the water-tank, the discharge portion of said connection being in the bottom of the body of water in the tank and between the flow and return water connections, substantially as described.

In testimony whereof I have hereunto set my hand in presence of two subscribing witnesses.

CHARLES W. CARRIER.

Witnesses:
HENRY WILLE,
E. H. SCHARRINGHAUSEN.